United States Patent
Dableh et al.

(10) Patent No.: US 12,342,439 B2
(45) Date of Patent: Jun. 24, 2025

(54) OPTICAL RESOLUTION REDUCTION ELEMENTS

(71) Applicant: JDRF ELECTROMAG ENGINEERING INC., Mississauga (CA)

(72) Inventors: Roumanos Dableh, Oakville (CA); Elias Boukhers, Hamilton (CA)

(73) Assignee: JDRF ELECTROMAG ENGINEERING INC., Mississauga (CA)

( * ) Notice: Subject to any disclaimer, the term of this patent is extended or adjusted under 35 U.S.C. 154(b) by 197 days.

(21) Appl. No.: 18/005,266

(22) PCT Filed: Jul. 14, 2020

(86) PCT No.: PCT/IB2020/056612
§ 371 (c)(1),
(2) Date: Jan. 12, 2023

(87) PCT Pub. No.: WO2022/013596
PCT Pub. Date: Jan. 20, 2022

(65) Prior Publication Data
US 2023/0269851 A1 Aug. 24, 2023

(51) Int. Cl.
*H05B 47/11* (2020.01)
*H05B 47/125* (2020.01)

(52) U.S. Cl.
CPC ......... *H05B 47/125* (2020.01); *H05B 47/11* (2020.01)

(58) Field of Classification Search
CPC ....... H05B 47/10; H05B 47/11; H05B 47/125
See application file for complete search history.

(56) References Cited

U.S. PATENT DOCUMENTS

| | | | |
|---|---|---|---|
| 6,486,778 B2 | 11/2002 | Mahler et al. |
| 8,253,852 B2 | 8/2012 | Bilbrey |
| 8,274,544 B2 | 9/2012 | Kurtz et al. |
| 8,754,960 B2 | 6/2014 | Ashdown |
| 9,014,829 B2 | 4/2015 | Chemel et al. |
| 9,042,085 B2 | 5/2015 | Ramrattan |
| 9,571,708 B2 | 2/2017 | Haddad |
| 9,848,167 B1 | 12/2017 | Christian et al. |
| 9,915,416 B2 | 3/2018 | Chemel et al. |

(Continued)

FOREIGN PATENT DOCUMENTS

WO 2012/061709 5/2012

OTHER PUBLICATIONS

PCT International Application No. PCT/IB20/56612, International Search Report, dated Oct. 7, 2020, 2 pages.

*Primary Examiner* — Jimmy T Vu
(74) *Attorney, Agent, or Firm* — DLA PIPER LLP (US)

(57) ABSTRACT

A controller based apparatus mounted on the ceiling of a room to control the lighting level of a space includes an image sensor/detector for capturing spatial data, ambient light data, and images and an optical element which allows sufficient light to pass through such that the image sensor can collect sufficient data to provide the controller in order to extract motion events, occupancy data, and/or ambient light readings while maintaining the privacy of individuals by reducing the optical resolution of the image sensor such that fine features, such as facial features or other identifiable features of people or objects, cannot be recorded or stored.

3 Claims, 5 Drawing Sheets

(56) References Cited

U.S. PATENT DOCUMENTS

| | | |
|---|---|---|
| 9,930,752 B2 | 3/2018 | Balazs et al. |
| 10,165,650 B1 | 12/2018 | Fini et al. |
| 10,291,861 B2 | 5/2019 | Djakovic et al. |
| 10,331,260 B2 | 6/2019 | Evans et al. |
| 11,304,274 B1 * | 4/2022 | Fu .................... H04N 23/90 |
| 2001/0015409 A1 | 8/2001 | Mahler et al. |
| 2010/0231506 A1 | 9/2010 | Pryor |
| 2010/0323608 A1 | 12/2010 | Sanhedrai et al. |
| 2011/0242345 A1 | 10/2011 | O'Gorman et al. |
| 2012/0057050 A1 | 3/2012 | Ashdown |
| 2012/0080944 A1 * | 4/2012 | Recker .................. H05B 47/16 307/25 |
| 2012/0143357 A1 | 6/2012 | Chemel et al. |
| 2015/0184842 A1 | 7/2015 | Chemel et al. |
| 2017/0135179 A1 * | 5/2017 | Balazs .................. H04N 25/00 |
| 2018/0195706 A1 | 7/2018 | Chemel et al. |
| 2019/0042769 A1 | 2/2019 | Sukhomlinov et al. |

* cited by examiner

OPTICAL RESOLUTION REDUCTION ELEMENTS

CROSS-REFERENCE TO RELATED APPLICATION

This application is a National Stage of PCT/IB2020/056612, filed Jul. 14, 2020, which is incorporated herein by reference in its entirety.

BACKGROUND

Environmental data collected in the proximity of a controller is used in some buildings to detect the presence of people in an area. The environmental data collected may include data such as occupancy status, or ambient light levels. Occupancy status may be used by various devices to control a device or a group of devices in a building. For example, occupancy status may be used to control lighting, ventilation systems, audio/visual equipment, and other devices in a building to conserve power when a space is unoccupied. The ambient light levels may be used to determine an established pattern, such as work hours, sunset or sunrise times, etc. to be used for predict behaviors to control lighting, ventilation systems, audio/visual equipment, and other devices in a building to increase comfort by predicting usage schedules while conserving power when use is not expected.

BRIEF DESCRIPTION OF THE DRAWINGS

Reference will now be made, by way of example only, to the accompanying drawings in which.

DETAILED DESCRIPTION

Figure 1:
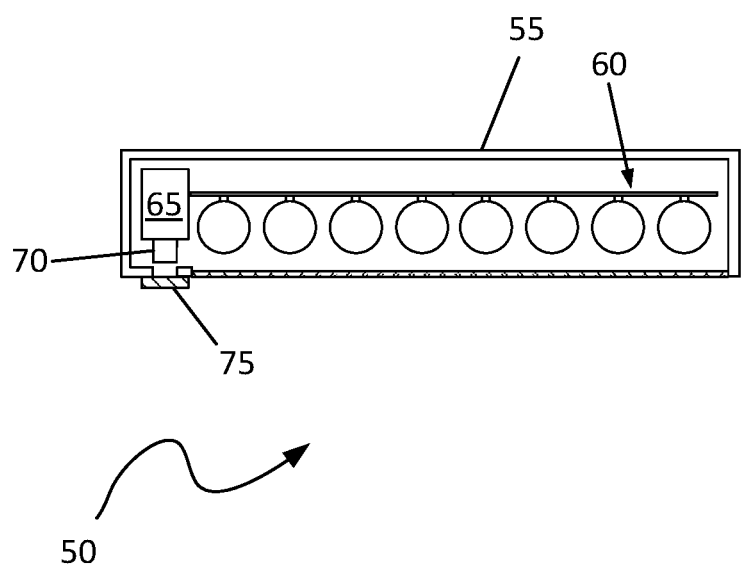
FIG. 1 is a schematic representation of the components of an example of an apparatus to maintain privacy and to illuminate a space.

As used herein, any usage of terms that suggest an absolute orientation (e.g. "top", "bottom", "up", "down", "left", "right", etc.) may be for illustrative convenience and refer to the orientation shown in a particular figure. However, such terms are not to be construed in a limiting sense as it is contemplated that various components will, in practice, be utilized in orientations that are the same as, or different than those described or shown.

Control devices may be used to automate devices. For example, control devices may use various sensors to collect data from a space to determine whether a device is to be powered on or powered off. The proliferation of such control devices have provided smart devices which may further predict behavior in a space such that some devices or systems may be powered on prior to use. For example, lighting systems may be turned on or the heat or air conditioning in a room may be turned on prior to an expected user arriving. In some examples, sensors may provide data to central or decentralized control devices and environmental devices or systems may be grouped together for control purposes.

One specific exemplary use of these control devices is for smart lighting technology for commercial buildings which offers a myriad of energy conservation, facility management and personalization capabilities. For example, smart lighting systems may allow lights to be grouped in a flexible manner and for the light level of each group to be automatically adjusted based on input from various sources such as occupancy sensors, motion sensors, daylight sensors, and other similar devices to detect occupancy. In some examples, a smart lighting system topology may include one or more sensors providing data to a control device mounted on each lighting fixture.

Other uses for such control devices may be for heating systems, such as a thermostat. Similar types of sensors may be used to detect occupancy and a memory storage unit may be used to store historical data to determine patterns of use for a space over a period of time. Accordingly, in this example, a control device may be used adjust a temperature in a space prior to predicted use, such as a predetermined time before a start of a work day to allow the space to equilibrate to a proper temperature.

The sensors are not particularly limited and may include occupancy sensors, motion sensors, ambient light sensors, cameras, and heat detectors. It is to be appreciated that due the proliferation of high resolution semiconductor image sensors, they may provide an economical choice for devices used for building automation. In particular, a high resolution image sensor that detects visible and/or Near Infrared (NIR) light may be used to detect occupancy, motion and/or ambient light, and/or heat signatures provided that the sensor is sensitive to the correct wavelengths of light. Since the high resolution semiconductor image sensors are presently manufactured in high volumes for use in the mobile phone industry, it may be more economically beneficial to use these image sensors instead of lower resolution sensors. The high resolution semiconductor image sensors may include hundreds or thousands of pixels to capture finer details in a space, such as facial features or other identifying features of people within the field of view. However, for the purposes of occupancy determination, motion sensing, ambient light measurements, or other data measured for controlling an apparatus, a few pixels, such as about three across a human face in the image may be used to obtain sufficient data for the control device.

An apparatus including an optical element to reduce the effective optical resolution of an image sensor is provided. The optical element is to be physically placed in from of the image sensor such that the addition of the optical element alters the optical transfer function of the system by a predetermined amount to provide sufficient light information to the image sensor to detect target events. In the present example, the image received at the image sensor is to have a low resolution such that features that may be used to identify individuals cannot be resolved at the image sensor. Accordingly, the optical element may be used as a privacy screening device. Although some systems may use electronic blurring algorithms, the image captured by the image sensor in such examples are high resolution and may be susceptible to hacking or reverse engineering. Furthermore, electronic blurring algorithms may be complicated to execute and demand increase computational resources.

Referring to FIG. 1, a schematic representation of an apparatus to illuminate a space is generally shown at 50. The apparatus 50 may include additional components, such as various additional interfaces and/or input/output devices such as indicators and sensors to interact with a user of the apparatus 50. The interactions may include viewing the operational status, updating parameters, or resetting the apparatus 50. In the present example, the apparatus 50 is to collect data passively to determine an occupancy status of the room. In other examples, the apparatus 50 may include active components such as a communications interface to interact communicate with other devices, such as a master controller. Further examples may include additional light emitters, such as an infrared emitter to generate reflections to be collected by the apparatus 50 and analyzed. In the present example, the apparatus 50 includes a housing 55, a light producing element 60, a controller 65, an image sensor 70, and an optical element 75.

The housing 55 is not particularly limited. For example, the housing 55 may be a unitary body encasing the other components of the apparatus 50. In particular, the housing 55 may be a material that is molded around the apparatus 50 to provide structural support and to provide. In the present example, the housing 55 is to be mounted on a ceiling in a room. In other examples, the housing may be mounted to a wall or be a free standing unit to be placed at a location in the room.

It is to be understood that the material of the housing 55 is not particularly limited to any material and that several different types of materials are contemplated. In addition, the housing 55 may be made from different materials such that different portions may have different properties. For example, the housing 55 may have a backing portion that is made from metal or another substantially rigid material that may be resistant to the heat generated by the light producing element 60 as well as providing adequate shielding. The bottom portion or the housing 55 may include a transparent or translucent material to allow light from the light producing element 60 to pass. Furthermore, in some examples, the image sensor 70 may also be placed behind a transparent covering in some examples to allow the image sensor 70 to collect data therethrough. In other examples, the housing may be constructed entirely from plastic via an injection molding process.

The light producing element 60 is to illuminate a space, such as a room or a portion of a room. In the present example, the light producing element 60 is mounted within the housing 55. The housing 55 may be to provide additional light in a direction by reflecting light from the light producing element 60. The light source of the light producing element 60 is not particularly limited and may be any device capable of generating light for the purposes of space lighting. For example, the light producing element 60 may include an incandescent light bulb, a fluorescent light bulb, a light emitting diode, or an array of any of these types of light emitters.

In the present example, the controller 65 is to control the light producing element 60. The controller 65 may be disposed within the housing 55 and in communication with the image sensor 70 and the light producing element 60. In other examples, the controller 65 may be attached externally to the housing 55. In further examples, the controller 65 may also be located at a remote location away from the light producing element 60 or be part of a central control system.

The manner by which the controller 65 operates or controls the light producing element 60 is not particularly limited. For example, the controller 65 may provide power to the light producing element 60 and operate the light producing element 60 by directly controlling the flow of power to the light producing element 60. Furthermore, the controller 65 may further control the intensity of the light producing element 60, such as by varying the power provided to the light producing element 60 or via a communications interface if the light producing element 60 is capable of controlling the intensity via an internal system. In other examples, the controller 65 may be a processor in communication with a separate power supply (not shown) to operate the light producing element 60.

In the present example, the image sensor 70 is to collect spatial data to be provided to the controller 65. The spatial data collected by the image sensor 70 is not particularly limited. Spatial data may include image information, such as an image recorded by the image sensor. The data collected by the image sensor 70 may include light of over a range of wavelengths. For example, the image sensor 70 may capture light in the visible spectrum from about 380 nm to about 740 nm. In other examples, the image sensor 70 may be sensitive to light outside the visible spectrum. In particular, some examples may include an image sensor 70 capable of detecting light with a wavelength greater than 740 nm in the infrared spectrum. By measuring light in the infrared spectrum, for example at a wavelength of about 850 nm, the image sensor 70 may capture heat signatures of people in a room even if the ambient light level is low.

In the present example, the image sensor 70 is capable of acquiring images at 15 frames per second, 30 frames per second or 60 frames per second. The image sensor 70 may also be equipped with 640×480 pixels that each have a patch of approximately 3 μm×3 μm. Other examples that may be used as the image sensor 70 may include various image capture rates, number of pixels, pixel architectures, various quantum efficiencies at different wavelengths, and different communication interfaces to a controller. It is to be appreciated by a person of skill with the benefit of this description that the image sensor 70 may have a high density of pixels to capture a high resolution image of the field of view. Accordingly, fine details that may be used to identify objects and people, such as facial features, distinguishing marks or clothing, may be captured by the image sensor 70.

The image sensor 70 is mounted to the housing 55 and includes a communication link with the controller 65. In particular, the image sensor 70 may be mounted within the housing 55 or attached to the exterior of the housing 55. The manner by which the image sensor 70 may be in communication with the controller 65 is not limited and may include wireless or wired connections.

The field of view of the image sensor 70 is not limited and may be dependent on the optical components of the image sensor 70. In some examples, the image sensor 70 may include a lens designed to provide a wide angle field of view whereby the horizontal and vertical field of view is at least 90°. In other examples, another lens may be used to provide a wider area of coverage to increase a field of view such that the diagonal field of view may be about 120° or more. It is to be appreciated that the transfer of contrast may not be a constant value across the entire field of view in some examples. For example, the modular transfer function value at the center of the field of view may be lower than near the edge of the field of view. The varying modular transfer function through the field of view may be used to mitigate the effects of barrel distortion.

The spatial data measured by the image sensor 70 is to be used by the controller 65 to operate and control the light producing element 60. The manner by which the light producing element 60 is controlled is not limited and may be customized from one installation to another. In some examples, the image sensor 70 may provide data from which movement or activity within its field of view may be detected. The detection of the movement or activity may be carried out by the image sensor 70 in some examples, may be carried out by the controller 65 analyzing the raw data from the image sensor 70. The controller 65 may monitor the data received from the image sensor 70 and when no motion, occupancy, or activity is present in the spatial data received from the image sensor 70, the controller 65 may power off the light producing element 60 after a predetermined period. In other examples, the controller 65 may adjust the illumination level instead of completely powering off the light producing element 60, such as by dimming the lights. If further examples, the controller 65 may carry out a staged reduction in illumination level, such as dimming lights for a first period of time and then powering off the lights after a second period of time. The predetermined period is may be a set period of time, such as 5 minutes. In other examples, the period may be variable depending on the time of day, such as during working hours. The period may also be dependent on the length of activity or motion prior to the beginning of the period of inactivity. In other examples, occupancy may be determined based on the data received from the image sensor 70a to control the lighting level.

During the period of inactivity, the controller 65 may monitor and/or analyze the spatial data received from the image sensor 70 to detect for any motion events. A motion event may include a person entering the field of view of the image sensor 70 or another object moving through the field of view of the image sensor 70. Upon the detection of the motion event, the controller 65 may power on the light producing element 60 to illuminate the space. In examples, where the light producing element 60 was dimmed, the controller 65 may increase the power or intensity of the light producing element 60.

In some further examples, the image sensor 70 may collect ambient light data in addition to spatial data. Ambient light data may be an average intensity of light received at the image sensor 70 across all pixels. Accordingly, the ambient light data may be measured by a single numerical value at any time. In other examples, the ambient light data may be divided into regions on the field of view of the image sensor 70. In this example, the image sensor 70 may be able to determine the ambient light from different directions. The ambient light data may then be provided to the controller 65 to be further processed and used to control the light producing element 60. In other examples, it is to be appreciated that the controller 65 may receive raw image data from the image sensor 70 from which the controller 65 may generate the ambient light data.

It is to be appreciated by a person of skill with the benefit of this description that the manner by which the controller 65 controls the light producing element 60 based on the ambient light data is not particularly limited. For example, the ambient light data may be stored in a memory storage unit (not shown) in the controller 65 to be used to generate an operation schedule for the light producing element 60. For example, the operation schedule of the light producing element 60 may be based on the amount of ambient light, such as from daylight through a window, to reduce the power consumption of the light producing element 60. Alternatively, the ambient light received from a known direction, such as a window, may be used to estimate the working hours of the building such that the light producing element 60 is increased in intensity to illuminate areas further from the windows.

The optical element 75 is to modify the optical transfer function of the optics providing light to the image sensor 70. In particular, the optical element 75 effectively reduces the optical resolution of the image formed on the image sensor 70 to render fine details indistinguishable. Accordingly, fine features such as facial features or other identifiable features of people or objects cannot be recorded or stored by the apparatus 50. It is to be appreciated by a person of skill with the benefit of this description, that by rendering fine features optically indistinguishable when arriving on image sensor 70, privacy may be maintained such that no identifying features are capable of being stored or transmitted. Therefore, it is not possible to use the apparatus 50 to track or record the movements of specific individuals or other identifiable objects. In particular, by optically reducing the resolution of the image instead of electronically reducing the image, such as via an image blurring algorithm, raw data from the image sensor 70 cannot be used in such a way.

In the present example, the optical element 75 is disposed in front the optical components, such as lenses, of the image sensor 70. The optical element 75 may be mounted external to the housing such that it is easily visible to a user of the room. Accordingly, an occupant of a room may easily see the cover and know that privacy in the room is maintained. In some examples, the optical element 75 may also include a unique color, shape, or other identifying feature to indicate that the apparatus 50 is operating with the optical element 75 to reduce the resolution of the image captured at the image sensor 70. It is to be understood that in other examples, the optical element 75 may be disposed within the housing 55 or other hidden or blended into the apparatus 50 to improve the aesthetic appearance of the apparatus 50 or to improve the packaging of the apparatus 50 during transportation and installation.

Furthermore, it is to be appreciated that the optical element 75 is to allow sufficient light to pass therethrough such that the image sensor 70 may still collect data to provide the controller 65 with the capability to control the light producing element 60. Accordingly, in some examples, the calibration of the optical element 75 may be to reduce the optical resolution of the image formed on the image sensor 70 to provide a low resolution image. The low resolution image is not particularly limited and may be sufficiently low such that no facial features in the low resolution image are distinguishable such that the low resolution image captured cannot be used to identify people. However, it is to be appreciated that the low resolution image is not too low, such as if the low resolution image were reduced effectively to a single pixel across the entire field of view. The low resolution image may retain sufficient resolution to provide spatial data to the controlled 65 to be used to control the light producing element 60. For example, the field of view captured by the image sensor 70 may include sufficient resolution to determine a general direction of motion, occupancy, or a general direction from which ambient light is emitted. In some examples, the resolution may vary across the field of view. In order to address the effects of barrel distortion, the effective resolution of the system may increase from the center of the image towards the edge of the field of view. Accordingly, the optical element 75 may be carefully calibrated to provide a target amount of reduction in the resolution.

As an example, the low resolution image may have about 4 pixels to cover a portion of the image that a face may occupy. In other examples, the low resolution image may have more pixels to cover a portion of the image that a face may occupy to enhance detection of objects and movements, but still not to provide sufficient resolution to identify a person. It is to be appreciated by a person of skill with the benefit of this description that the portion of the image that a face may occupy is dependent on the positioning of the apparatus and the geometry of the room and positioning of the apparatus 50. Therefore, a different optical element 75 with different physical properties may be used in different installations where the apparatus 50 is to be installed with different geometries.

The material from which the optical element 75 is formed is not limited. In the present example, the optical element 75 may include multiple components for obscuring the light passing therethrough as well as providing a components to support and secure the optical element 75 to the housing 55 or other structure close to the image sensor 70. The optical element 75 may be primarily plastic, but may also be made from other materials such as glass, crystal, and silicon. Furthermore, the manner by which the optical element 75 reduces the optical resolution is not particularly limited. For example, the optical element 75 may include a lens to de-focus the image at the image sensor 70 effectively to blur the image. The lens is not particularly limited and may include various form factors. In some examples, the optical element 75 may include a lens that is planoconvex or biconvex. Furthermore, each side of the lens may have curvature that is spherical or aspherical. In other examples, the optical element 75 may include a filter to reduce or diffuse light arriving at the image sensor 70.

Figure 2A:
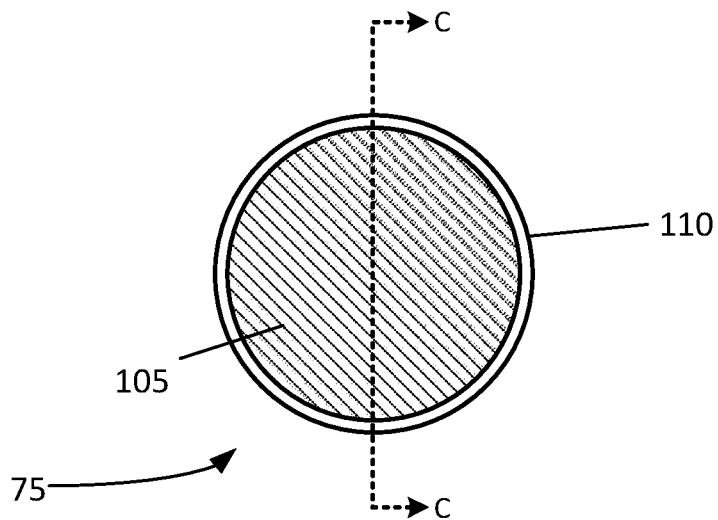
FIG. 2A is a view from the object side of an example of an optical element to reduce the optical resolution of an image to maintain privacy.
Figures 2B, 2C:
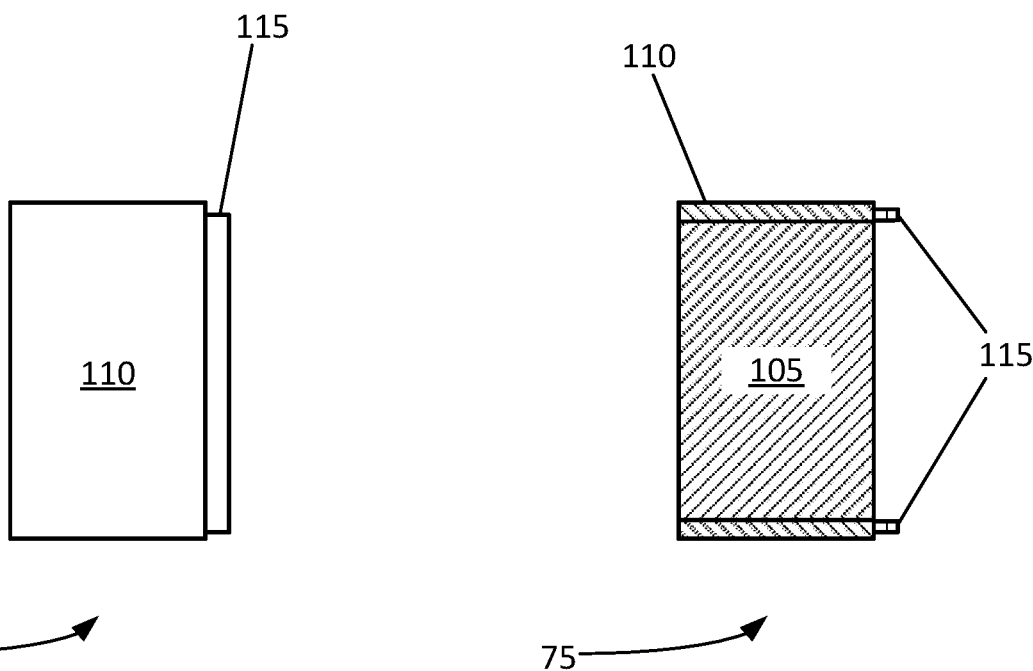
FIG. 2B is a side view of the optical element shown in FIG. 2A to reduce the optical resolution.
FIG. 2C is a cross section view of the example of an optical element shown in FIG. 2A along the line C-C.

Referring to FIGS. 2A, 2B, and 2C, an optical element 75 to modify an optical transfer function of an image sensor 70 to reduce the optical resolution is shown in greater detail. The optical element 75 may be mounted to the housing 55 as in the present example. Alternatively, the optical element 75 may be mounted directly onto the image sensor 70 or other optical components associated with the image sensor. It is to be appreciated by a person of skill in the art with the benefit of this description that the optical element 75 may be part of the apparatus 50 as described above or sold as a separate component for retrofitting existing smart lighting which may have a camera capable of capturing high resolution images that include identifying information. In other examples, the optical element 75 may also be used on any camera system where identifying features are to be obscured. In the present example, the optical element 75 includes an obscuring element 105, a holder 110, and a mounting interface 115.

The obscuring element 105 is to modify the optical transfer function of the optics providing light to the image sensor 70. In the present example, the image sensor 70 is described in greater detail above and is to collect spatial data for the purpose of controlling a light producing element 60. In particular, the image sensor 70 may include optics such as various lens to focus a high resolution image onto a detector of the image sensor 70. The high resolution image is not particularly limited, but in the present example where the image sensor 70 is mounted within the housing 55, the image sensor 70 may capture a high resolution image of an entire room or a portion of the room.

The obscuring element 105 is to effectively reduce the optical resolution of the image formed on the detector of the image sensor 70 to provide a low resolution image. Accordingly, fine features such as facial features or other identifiable features of people or objects cannot be distinguished from the data collected by the image sensor 70. It is to be appreciated by a person of skill with the benefit of this description, that by rendering fine features optically indistinguishable when arriving on image sensor 70, privacy may be maintained such that no identifying features are capable of being stored. Furthermore, by optically reducing the resolution of the image with the obscuring element 105, privacy is maintained even in the raw data from the image sensor 70.

Although the obscuring element 105 is to reduce the optical resolution, the obscuring element 105 is also to allow sufficient light to pass therethrough such that the image sensor 70 may capture a low resolution image to provide the controller 65 with the capability to control the light producing element 60 based on the spatial data of the low resolution image. As an example, the low resolution image may have about 4 pixels to cover a portion of the image that a face may occupy. In other examples, the low resolution image may have more pixels to cover a portion of the image that a face may occupy to enhance detection of objects and movements while not providing sufficient resolution to identify a person. It is to be appreciated by a person of skill with the benefit of this description that the portion of the image that a face may occupy is dependent on the positioning of the apparatus and the geometry of the room and positioning of the image sensor 70. Therefore, a different obscuring element 105 with different physical properties may be used in different installations with different geometries.

The material from which the obscuring element 105 is made is not limited. In the present example, the obscuring element 105 may be a plastic optical component. However, in other examples, the obscuring element 105 made be made from other materials such as glass, crystal, paper. Furthermore, the manner by which the obscuring element 105 reduces the optical resolution is not particularly limited. For example, the obscuring element 105 may be a lens to de-focus the image at the detector of the image sensor 70 to cause blurring. In other examples, the obscuring element 105 may include a filter to reduce or diffuse light passing therethrough. For example, the obscuring element 105 may be made from a translucent material.

The holder 110 is to support the obscuring element 105. The manner by which the holder 110 supports the obscuring element 105 is not limited. In general, the holder 110 is to support the obscuring element 105 near the edge of the obscuring element 105 such that the holder 110 does not substantially obscure the light passing through the obscuring element 105. In the present example, the holder 110 may be a plastic ring or border into which the obscuring element 105 may be secured using a friction fit. In other examples, the holder 110 may include ridges or notches which may engage with complementary features of the obscuring element 105. Other examples may also use adhesive materials, fasteners, or other methods to secure the obscuring element 105 to the holder.

The mounting interface 115 is to secure the holder 110 and the obscuring element 105 in a fixed position relative to the image sensor 70. In particular, the mounting interface 115 is to secure the obscuring element 105 in front of the optics associated with the image sensor 70, such as a lens to focus light onto the detector of the image sensor 70.

In the present example, the mounting interface 115 is disposed on the holder 110. In other examples, the mounting interface may be applied to the obscuring element 105 directly. The manner by which the mounting interface 115 secures the holder 110 relative to the image sensor 70 is not particularly limited. The mounting interface 115 may be an adhesive ring applied or disposed onto a face of the holder to be secured to the housing 55 around the image sensor 70. In other examples, the mounting interface 115 may include a fastener, such as a clip, a screw, a bolt, or an adhesive.

Figure 3:
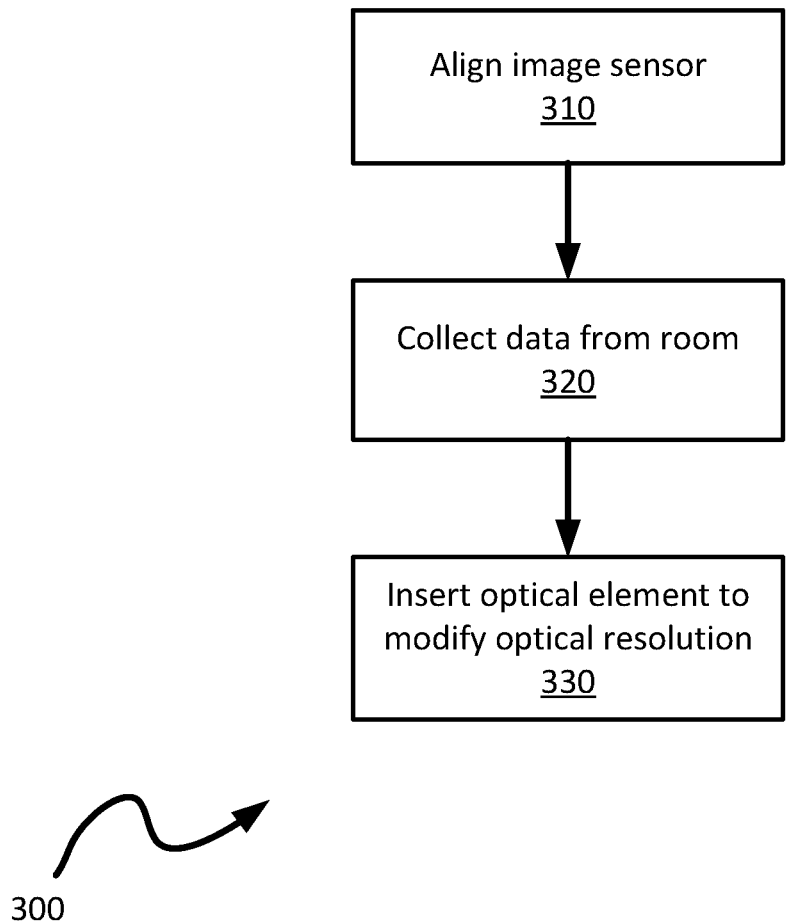
FIG. 3 is a flowchart of an example of a method of reducing an optical resolution of an image.

Referring to FIG. 3, a flowchart of reducing an optical resolution of an image sensor is generally shown at 300. In order to assist in the explanation of method 300, it will be assumed that method 300 may be performed with the apparatus 50. Indeed, the method 300 may be one way in which the apparatus 50 may be configured. Furthermore, the following discussion of method 300 may lead to a further understanding of the apparatus 50 and its components. In addition, it is to be emphasized, that method 300 may not be performed in the exact sequence as shown, and various blocks may be performed in parallel rather than in sequence, or in a different sequence altogether.

Beginning at block 310, an image sensor 70 is to be aligned. The manner by which the image sensor is aligned light is not particularly limited. In the present example, the apparatus 50 as a whole is to be mounted to a ceiling in the room to provide illumination to a space. In other examples, the image sensor 70 may be retrofitted into an existing light installation to convert a conventional lighting system into a smart lighting system. It is to be appreciated that the image sensor 70 is to be aligned to capture a substantial portion of the room such that spatial and/or ambient light data may be collected for a controller 65 to control the light producing element 60.

Block 320 comprises collecting data about the room via the image sensor 70. In the present example, the image sensor 70 includes a detector which may be used to capture an image. The image sensor 70 may also include additional components to focus the light onto the detector.

Next, block 330 comprises inserting an optical element 75 in front of the image sensor to modify the optics of the image sensor 70. In particular, the optical element is to change the optical resolution of the image sensor 70. It is to be appreciated by a person of skill with the benefit of this description that block 330 may occur prior to block 320 if the optical element 75 is installed during the initial installation of the apparatus. In other examples, the apparatus 50 may be retrofitted with the optical element 75 or the optical element 75 may be added after testing the apparatus 50 immediately after an installation.

In the present example, the optical element 75 is reduce the optical resolution of image sensor 70. In particular, the optical element 75 is to reduce the resolutions such that fine features, such as facial features or other identifiable features of people or objects, cannot be recorded or stored by the apparatus 50 to increase and/or maintain privacy. However, the optical element 75 is also to allow sufficient light to pass therethrough such that the image sensor 70 may still collect sufficient data to provide the controller 65. The data provided to the controller 65 is to include sufficient information to extract motion events, occupancy data, and/or ambient light readings. For example, the area subtended by a pixel at a distance of 50 cm may be said to be no larger than 4 cm×4 cm.

Figure 4:
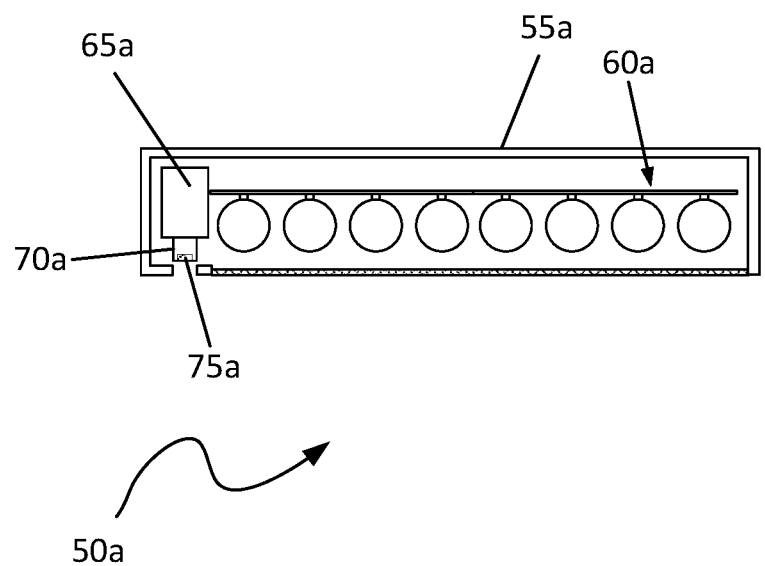
FIG. 4 is a schematic representation of the components of another example of an apparatus to maintain privacy and to illuminate a space.

Referring to FIG. 4, another example of an apparatus 50a to illuminate a space is generally shown. Like components of the apparatus 50a bear like reference to their counterparts in the apparatus 50, except followed by the suffix "a". The apparatus 50a includes a housing 55a, a light producing element 60a, a controller 65a, an image sensor 70a, and an optical element 75a.

In the present example, the housing 55a, the light producing element 60a, and the controller 65a are substantially similar to the housing 55, the light producing element 60, and the controller 65, respectively. It is to be appreciated that in some examples, the image sensor 70 and the optical element 75 of the apparatus 50 may be replaced with the image sensor 70a, and the optical element 75a.

Figure 5:
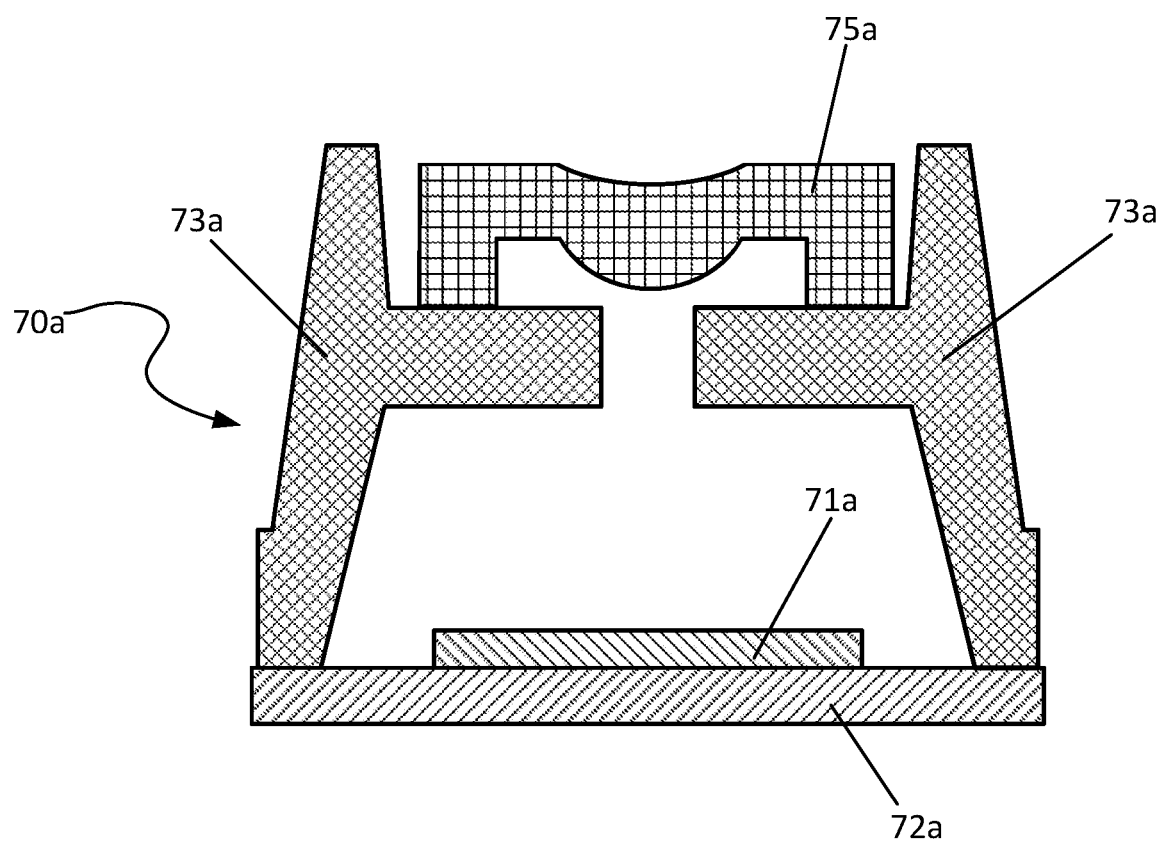
FIG. 5 is a detailed view of the image sensor and the optical element of the apparatus of FIG. 4.

Referring to FIG. 5, the image sensor 70a, and the optical element 75a are shown in greater detail. In the present example, the image sensor 70a includes a light detector array 71a mounted on a substrate 72a.

The light detector array 71a is not particularly limited. In the present example, the light detector array 71a may be a system-on-a-chip video graphics array (VGA) sensor. In particular, the light detector array 71a may be a VGA resolution image sensor. In other examples, the light detector array 71a may be a chip having higher resolution capabilities, or a chip having lower resolution capabilities.

The substrate 72a is to provide sufficient physical support for the light detector array 71a in addition to the electrical connections to transfer data from the light detector array 71a to the controller 65a.

A lid 73a may also be disposed about the light detector array 71a. In the present example, the lid 73a is opaque and includes an opening to allow light to reach the light detector array 71a. For example, the opening may be a pinhole in some examples. In other examples, the opening may be wider such that a lens (not shown) may be used to focus light to form a sharp image on the light detector array 71a.

In the present example, the optical element 75a is a biconvex lens to direct light onto the light detector array 71a. The manner by which the optical element 75a alters the optical path of light is not particularly limited. For example, the optical element 75a may focus the light received such that motion and occupancy in the field of view may be determined. However, the optical element 75a may obscure fine features such that they are indistinguishable by the light detector array 71a.

It should be recognized that features and aspects of the various examples provided above may be combined into further examples that also fall within the scope of the present disclosure.

What is claimed is:

1. An apparatus comprising:
    an obscuring element to modify an optical transfer function of an image sensor, wherein the image sensor is to collect spatial data to control a light producing element;
    a holder to support the obscuring element; and
    a mounting interface disposed on the holder, wherein the mounting interface is to secure the obscuring element in front of an image sensor lens, wherein the obscuring element is to reduce an optical resolution of the image sensor to maintain privacy.

2. The apparatus of claim 1, wherein the obscuring element is to reduce the optical resolution to provide a low resolution image to the image sensor.

3. The apparatus of claim 2, wherein the low resolution image is to provide the spatial data to control the light producing element.

* * * * *